(12) United States Patent
Herbert

(10) Patent No.: US 10,006,552 B1
(45) Date of Patent: Jun. 26, 2018

(54) WATER AND ENERGY SAVING THERMOSTATIC VALVE

(71) Applicant: Edward Herbert, Canton, CT (US)

(72) Inventor: Edward Herbert, Canton, CT (US)

(*) Notice: Subject to any disclaimer, the term of this patent is extended or adjusted under 35 U.S.C. 154(b) by 0 days. days.

(21) Appl. No.: 15/678,184

(22) Filed: Aug. 16, 2017

(51) Int. Cl.
| | |
|---|---|
| *F16K 11/22* | (2006.01) |
| *G05D 23/02* | (2006.01) |
| *F16K 31/05* | (2006.01) |
| *F16K 31/60* | (2006.01) |
| *F22D 5/26* | (2006.01) |
| *F16K 27/00* | (2006.01) |

(52) U.S. Cl.
CPC .............. *F16K 11/22* (2013.01); *F16K 31/05* (2013.01); *F16K 31/60* (2013.01); *F22D 5/26* (2013.01); *F16K 27/00* (2013.01)

(58) Field of Classification Search
CPC .......... F16K 11/22; F16K 27/00; F16K 31/05; F16K 31/60; F22D 5/26; G05D 23/021; G05D 23/022

USPC ............................. 236/93 B, 99 J, 99 K, 100
See application file for complete search history.

(56) References Cited

U.S. PATENT DOCUMENTS

| | | | |
|---|---|---|---|
| 9,737,899 B2 * | 8/2017 | Doss | ........................ E03C 1/023 |
| 2014/0196801 A1 * | 7/2014 | Brown | ................... E03C 1/0408 137/468 |

* cited by examiner

*Primary Examiner* — Marc Norman

(57) ABSTRACT

A valve for saving water and energy in a shower uses a wax motor as an actuator. Below the activation temperature of the wax motor, the valve is open and the shower water flows. When the water reaches the activation temperature, the piston of the wax motor extends and turns off the water in the shower. The person taking the shower then can restore flow by turning a handle. The shower can then be turned off and on at will by turning the handle manually. When the valves cools down, it resets automatically.

2 Claims, 7 Drawing Sheets

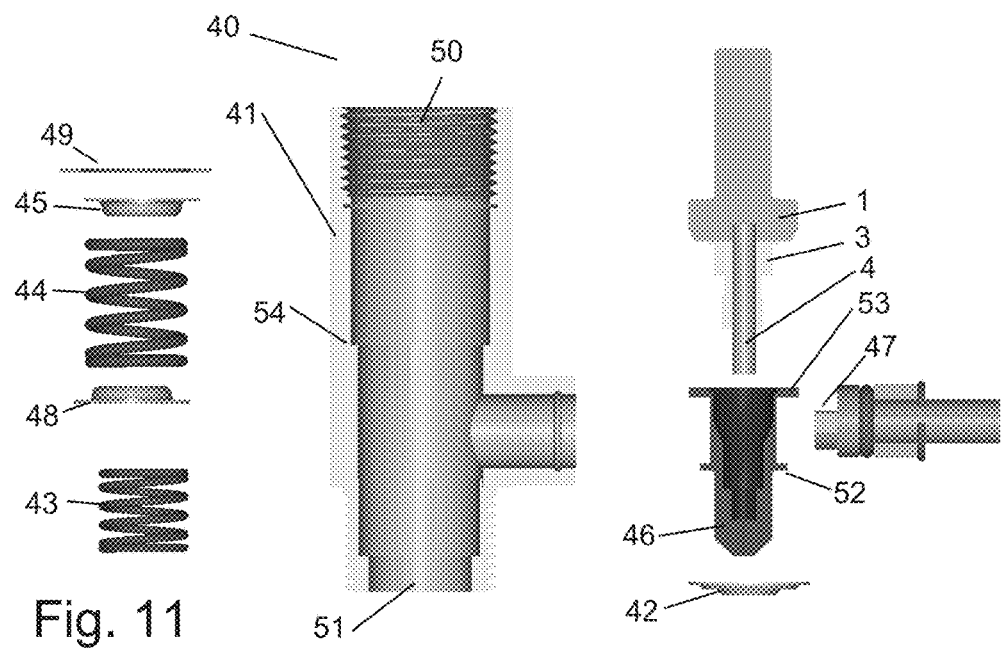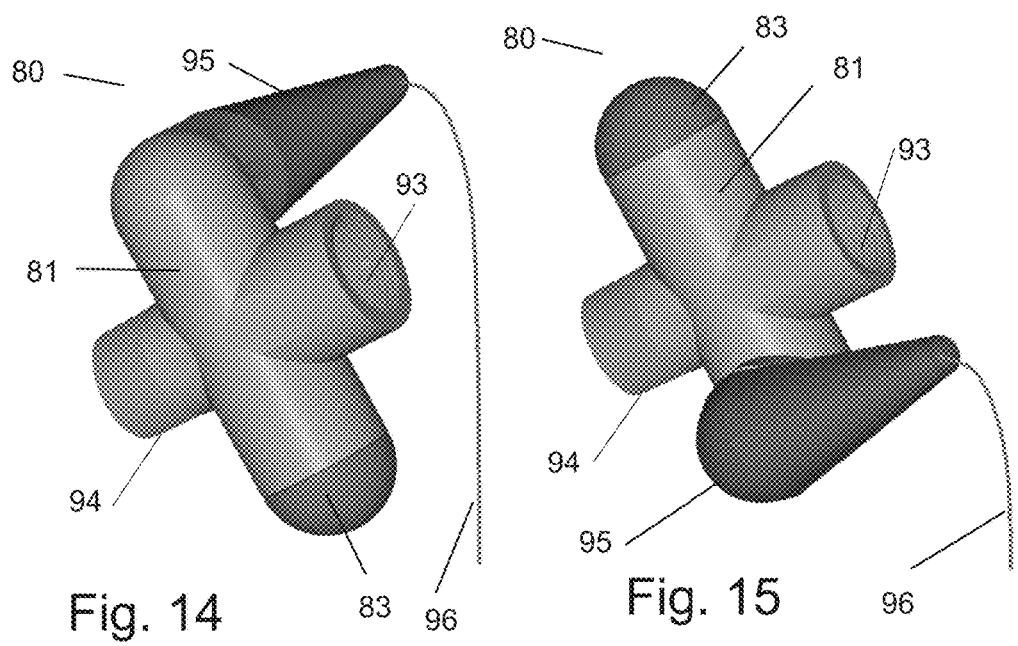

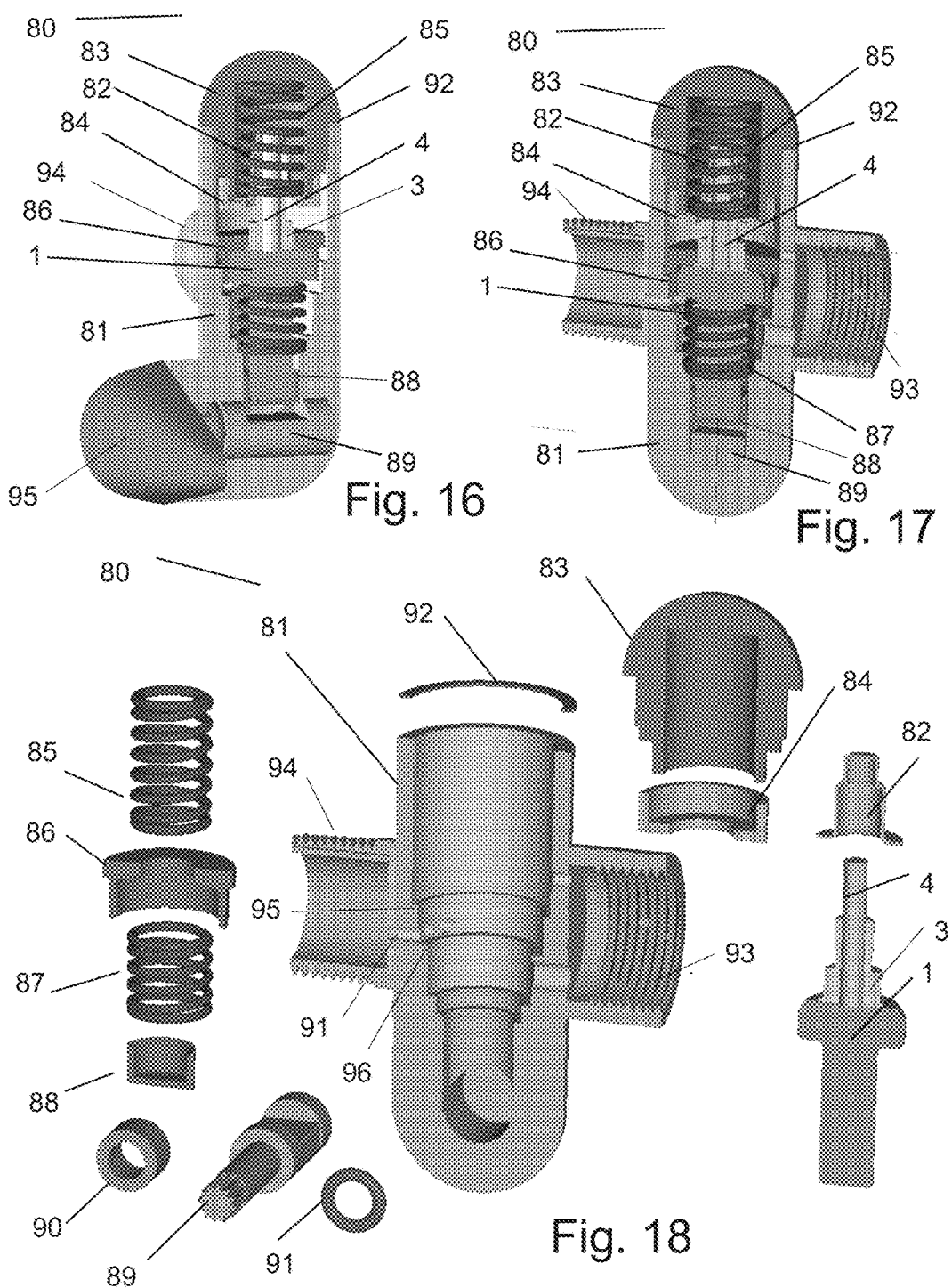

WATER AND ENERGY SAVING THERMOSTATIC VALVE

BACKGROUND OF THE INVENTION

This invention relates to water valves, and more particularly to thermostatically controlled water valves intended to save water and energy.

When a person takes a shower, a frequent occurrence is that the person turns on the hot water, but it takes a while for the water to become hot, so the person wanders off and does something else for a while. In the meanwhile, the water eventually becomes hot, but it takes longer for the person to return. In this circumstance, the hot water flows unused for a period of time, wasting both the water and the energy that it took to heat it.

SUMMARY OF THE INVENTION

The present invention teaches an apparatus that turns off the water once it becomes hot, and it remains off until the person returns and resets the water flow by turning the handle. At that time, normal water flow resumes, and the person can take a shower normally.

At the end of the shower, the apparatus will cool down and reset automatically.

The valve can also be used to turn the water off and on during the shower, if, for example, the person wanted to save water by lathering and rinsing.

The thermostatic device within the valve is a wax motor. Wax motors are well known thermostatic devices, one familiar application being the hot water thermostat in a gas or diesel engine. The wax motor comprises an enclosed capsule containing wax with a specific melting point. The wax used has the property that it has an unusually large thermal expansion in transitioning from the solid phase to the liquid phase, and it can exert very large pressure on a piston that is responsive to the expansion of the wax as it melts.

Wax motors usually will not retract by themselves when cooled, so an external force must be applied as it cools. Usually an apparatus using a wax motor contains a strong spring to ensure retraction.

Another characteristic of a wax motor is that the wax may continue to melt after the piston has extended sufficiently to actuate the apparatus, and this over-extension is capable of exerting very high force. This over-extension must not be constrained, or the wax motor may be damaged permanently. The apparatus must allow this over-extension, and a relief spring is used to accommodate this over-extension.

BRIEF DESCRIPTION OF THE FIGURES

FIG. 11 shows the valve of FIG. 10 with the parts separated, to show the details of the parts more clearly.

FIGS. 14 through 21 show an alternative embodiment of the valve having transverse water flow, so that the valve can be shorter.

FIGS. 14 and 15 show that the valve may be operated by short persons, and that is the case for different orientations of the valve, depending on how many turns are required to make a tight fit to a supply pipe (not shown).

FIGS. 16 and 17 show, respectively, a front section view and a side section view of the valve of FIG. 15 when the water is cold and the valve is open.

FIG. 18 shows the valve of FIG. 17 with the parts separated, to show the details of the parts more clearly FIG. 19 shows the valve of FIG. 17, except the water now is warm and the valve is closed.

FIG. 20 shows the valve of FIG. 17, except the water is warm and the cam has been actuated so that the valve is open.

FIG. 21 shows the valve of FIG. 17, except the water is warm, the cam has been actuated so that the valve is open, and the piston of the wax motor is over-extended.

In FIG. 22, the valve is open. In FIG. 23, the valve is closed.

DETAILED DESCRIPTION

Figure 1:
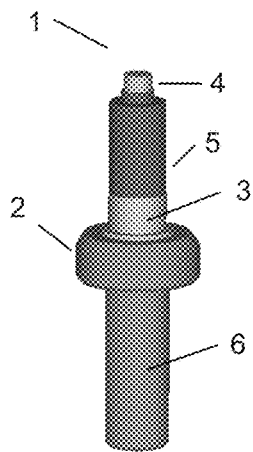
FIGS. 1, 2 and 3 show a wax motor at different temperatures, showing different extensions of the piston: retracted, extended and over-extended.
Figure 2:
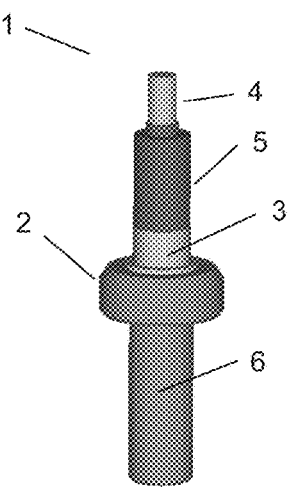
Figure 3:
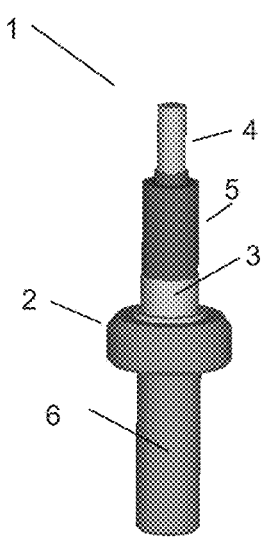

FIGS. 1 through 3 show a wax motor 1, which is the actuator used in various embodiments of this invention. The visible parts of the wax motor 1 comprise a capsule 2, a piston 4 and it may include a rubber jacket 5. The capsule 2 comprises a body 6 and a bushing 3. The body 6 usually is made of copper, and it contains the wax and seals necessary for the operation of the wax motor 1. The busing 3 usually seals the body 6, and usually has a flat surface that is a reference plane. The neck of the bushing 3 may be threaded to facilitate installation into a higher assembly. The jacket 5 is optional and most embodiments of the invention use the wax motor 1 with the jacket 5 removed because suitable protection for the piston 4 can be provided in a different way, and without the jacket 5, more precise fit between the piston 4 other parts of this invention is facilitated.

Wax motors are well known thermostatic devices, one familiar application being the hot water thermostat in a gas or diesel engine. The wax motor comprises an enclosed capsule 2 (the body 6 and the bushing 3) containing wax with a specific melting temperature, which is the actuation temperature. The wax used has the property that it has an unusually large thermal expansion in transitioning from the solid phase to the liquid phase, and it can exert very large pressure on the piston 4 that is responsive to the expansion of the wax as it melts. The piston 4 extends from the wax motor 1, guided by the bushing 3 in response to temperature as the wax melts. The internal construction of the wax motor 1 is not a point of novelty for this invention, and it is well known by those skilled in the art of wax motors, so it is not shown nor discussed in detail.

The manufacturer of the wax motor 1 will specify several parameters that must be observed for correct operation. One parameter is a minimum required piston force that must be applied to the piston 4 to ensure that the piston 4 retracts correctly when the temperature is below the actuation temperature. In the use of the wax motor, a working spring force is controlled by the design of the preload of a working spring 16 (looking ahead to FIG. 4). The manufacturer of the wax motor 1 will also specify a maximum piston force above which the wax motor may be damaged. A relief spring 14 is designed so that its maximum relief spring force when the relief spring 14 is compressed to its minimum length when the piston 4 is over-extended is less than the specified maximum piston force.

In FIG. 1, the wax motor 1 is shown in its cold state, when the temperature is below the actuation temperature. The piston 4 is retracted into the capsule 2.

FIG. 2 shows the wax motor 1 as it is warming and has reached the actuation temperature. The piston 4 is partly extended from the capsule 2.

FIG. 3 shows the wax motor 1 when the wax therein is fully melted because the temperature is maintained at or above the actuation temperature. The piston 4 is over-extended from the capsule 2 to its maximum extent.

FIGS. 4 through 9 show a representative valve 10 of this invention.

Figure 4:
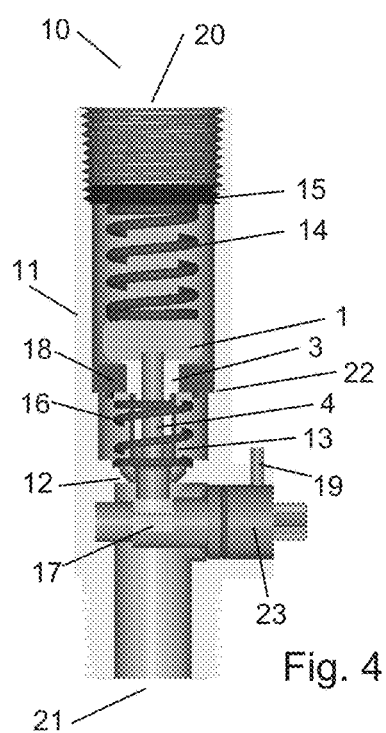
FIG. 4 shows a front view section of a valve while it is in its cold state.

FIG. 4 shows a front view section of the valve 10.

Figure 5:
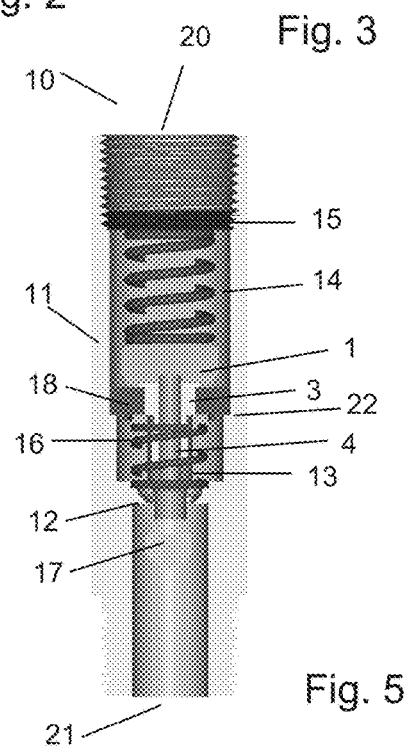
FIG. 5 shows a side view section of the valve of FIG. 4.

FIG. 5 shows a side view section of the valve 10 of FIG. 4.

Figure 6:
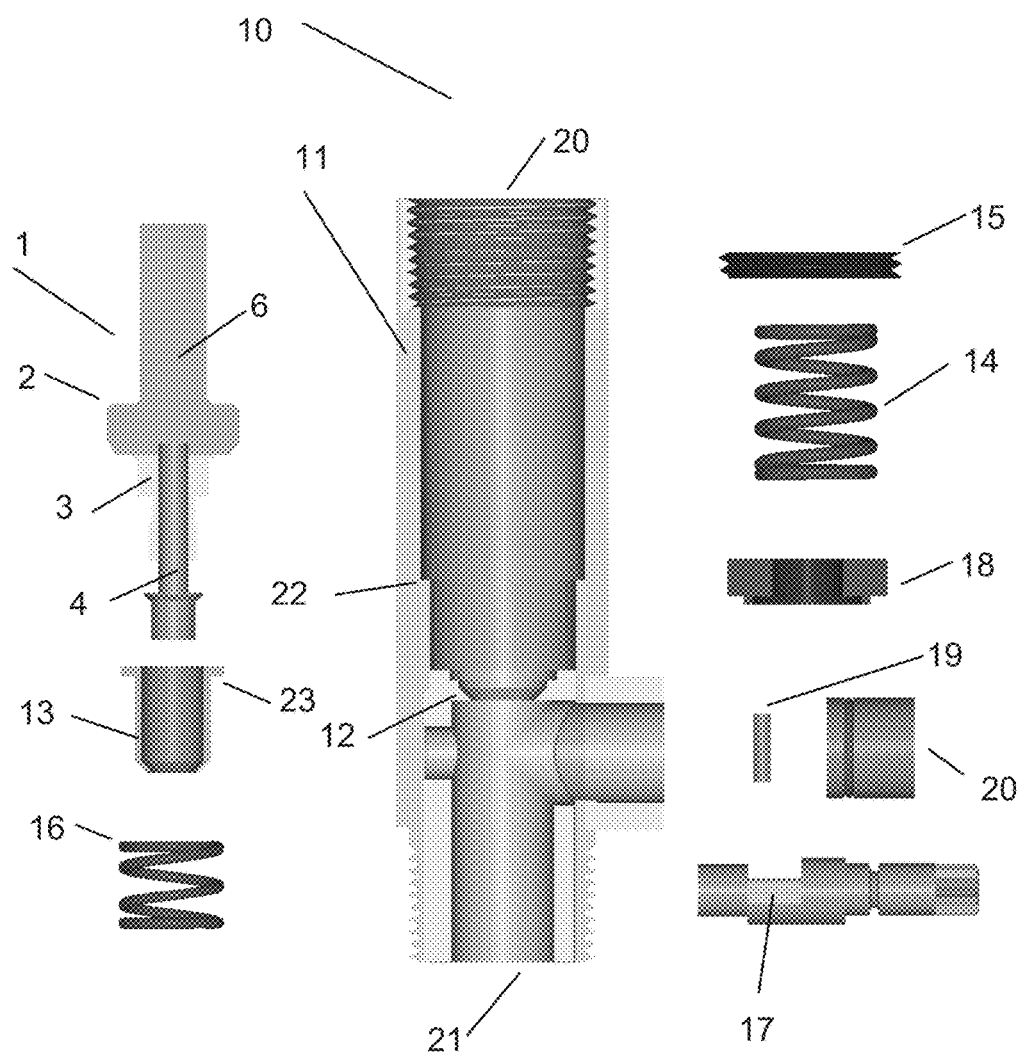
FIG. 6 shows a front section view of the valve of FIG. 4 with its parts separated to show the individual parts more clearly.

FIG. 6 shows an exploded front view section of the valve 10 of FIG. 4, to show the several parts more clearly. However, a few of the parts are not section views, as full views show details better.

The valve 10 comprises a valve body 11, which may be made of brass, as an example, not a limitation. One end of the valve body 11 is an inlet 20 for receiving water, which may have female pipe threads (FPT) for attaching to a supply of hot water. The other end of the valve body 11 is an outlet 21, which may have male pipe threads (MPT) for attaching to a shower head.

A wax motor 1 is mounted movably within the valve body 11. The wax motor 1 is constrained radially by a sliding bushing 18 which is threaded onto the bushing 3 of the wax motor, but wax motor 1 is movable axially, constrained by a step 22 on the inside diameter of the valve body 11. The wax motor 1 and the sliding bushing 18 are held against the step 11 to hold the wax motor 1 in its nominal position within the valve body 11 by a relief spring 14, but the relief spring 14 can compress as necessary when the piston 4 of the wax motor 1 is over-extended to allow axial movement of the wax motor 1 away from its nominal position. The relief spring 14 is retained in the valve body 11 by a retainer 15.

The piston 4 of the wax motor 1 acts upon a valve plunger 13. When the wax motor 1 is heated to its actuation temperature, the piston 4 extends and pushes the valve plunger 13 toward a valve seat 12 to close the valve 10 and stop the flow of water. In this illustration, the valve seat 12 is machined into the valve body 11, but alternatively, it can be a separate insert of a more corrosion-resistant material.

The valve plunger 13 has a flange 23 that engages the working spring 16. The function of the working spring 16 is to provide the correct working spring force on the piston 4 so that it retracts properly into the wax motor 1 when it cools to below the melting point of the wax therein (below the actuation temperature).

Below the valve plunger 13 and the piston 4, there is a cam 17 that can be rotated within the valve body 11 and engage the valve plunger 13 and the piston 4 The function and the operation of the cam will be explained below, in the discussion of FIGS. 7 through 9.

The sliding bushing 18 as shown has a threaded inside diameter, and it is screwed onto threads on the bushing 3 of the wax motor 1. Alternatively, the sliding bushing 18 could have a smooth inside diameter, and it could be retained on the bushing 3 by a nut (not shown). The sliding bushing 18 controls the axial position of the wax motor 1 to keep it centered in the valve body 11. The sliding bushing 18 rests against the stop 22 to keep the the wax motor 1 in its nominal position is when the piston 4 of the wax motor 1 is retracted or extended, but it allows the wax motor 1 to move axially when the piston 4 is over-extended or the valve 10 has been opened by actuating the cam 17.

The sliding bushing 18 is not held rigidly against the stop 22, however. It is urged to that nominal position by the relief spring 14, which is much stronger than the working spring 16, enough stronger that it does not yield while the working spring 16 is operative, as further explained below in the discussion of FIGS. 7 through 8.

FIGS. 4 and 5 show the valve 10 in its state when the water is cool, that is, when the temperature of the wax motor 1 is below its actuation temperature. The piston 4 is retracted, and the valve plunger 13 and the valve seat 12 are separated, so the valve 10 is open and water can flow.

Figure 7:
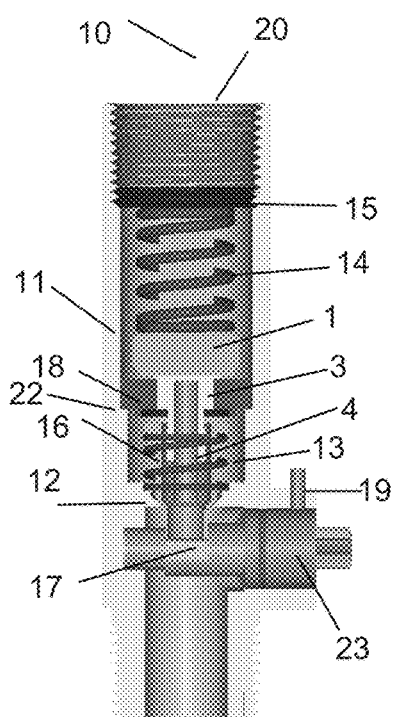
FIG. 7 shows a front view section of the valve of FIG. 4, except that it is heated sufficiently so that the piston is extended to close the valve.

FIG. 7 shows the valve 10 in its state as the water reaches the operating temperature and the wax in the wax motor 1 is partly melted. The piston 4 is partly extended and pushes the valve plunger 13 against the valve seat 12, effectively closing the valve 10 and interrupting the flow of water through the valve 10.

Figure 8:
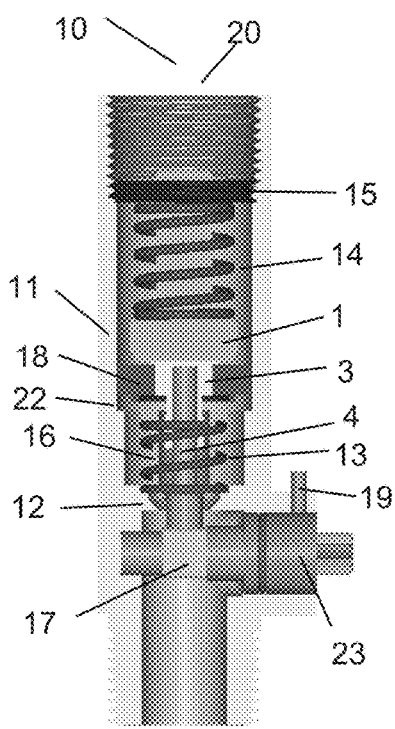
FIG. 8 shows a front view section of the valve of FIG. 4, except that it is now opened by actuating a cam so that water can flow.

FIG. 8 shows that the cam 17 may be turned 90° to engage the end of the valve plunger 13 and the piston 4 so as to push the valve plunger 13 upwards away from the valve seat 12 and thus open the valve 10 to permit the flow of water through the valve 10. However, because the piston 4 is still extended relative to the wax motor 1 and the force of the wax motor 1 is very strong, this pushes the wax motor 1 and the first bushing 18 upwards, partly compressing the relief spring 14. The cam 17 is retained in the valve body by a bushing 20, which in turn is retained by a set screw 19.

Figure 9:
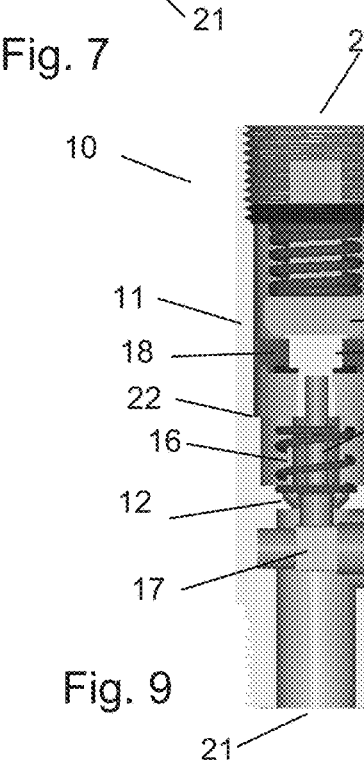
FIG. 9 shows a front view section of the valve of FIG. 4, except that it is now opened by actuating a cam so that waster can flow, and the piston of the wax motor is over-extended.

FIG. 9 shows that the piston 4 of the wax motor 1 continues to over-extend as the wax in the wax motor 1 melts completely, further compressing the relief spring 14. The design of the relief spring 14 is such that it will not compress fully (bottom out) before the piston 4 has over-extended the maximum amount from the wax motor 1 when the wax therein is fully melted.

In FIG. 7, it can be seen that the cam 17 is flat, as drawn and does not engage the valve plunger 16 nor the piston 4. In FIGS. 8 and 9, the cam 17 is vertical and the valve plunger 16 and the piston 4 are lifted. This also lifts the wax motor 1 and partially compresses the relief spring 14, which has a high force. The sides of the cam 17 are flat surfaces, so the high force from the relief spring 14 maintains a detent on the cam 17, tending to hold the cam 17 in the actuated position as shown in FIGS. 8 and 9. This detent mechanism holds the cam in the activated position as shown in FIGS. 8 and 9 as long as the piston 4 of the wax motor 1 is extended or over-extended. However, when the piston 4 of the wax motor 1 is retracted, there is no longer force on the piston 4 and the valve plunger 13 to hold the cam 17 in its actuated position, so the detent releases the cam 17 to return to its quiescent position.

Figure 10:
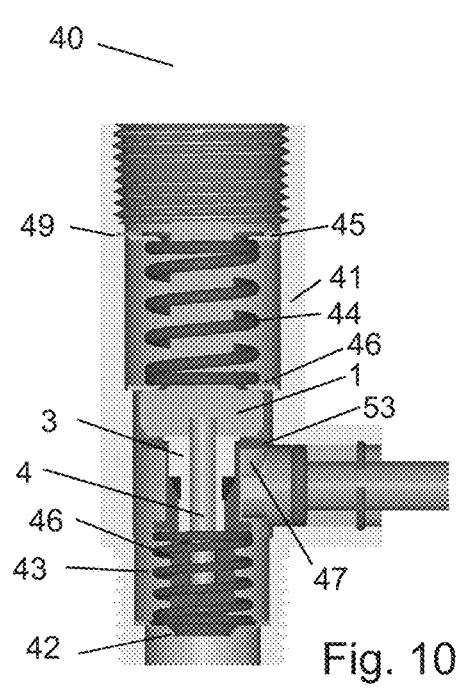
FIG. 10 shows an alternate embodiment of the valve in which the cam operates on the side of the valve plunger.

FIGS. 10 and 11 show an alternative embodiment of the invention. A valve 40 of this invention has a valve body 41 enclosing the valve 40. The valve body 41 may have female pipe threads 50 on one end for connecting to a source of water, and it may have male pipe threads 51 on the other end for connecting to a shower head.

FIG. 11 shows an exploded front view section of the valve 40 of FIG. 10, to show the several parts more clearly. However, a few of the parts are not section views, as full the views show details better.

In FIGS. 10 and 11, a wax motor 1 has a piston 4 which engages a valve plunger 46. A working spring 43 engages a flange 52 on the valve plunger 46 to maintain a force on the valve plunger 46 to keep the piston 4 retracted when the wax motor 1 is cold. When the wax motor is cold, a relief spring 44 presses on a washer 48 which in turn presses on the wax motor 1 to hold the wax motor 1 in its nominal position as determined by a step 54 on the inside diameter of the valve body 41. The relief spring 44 is held in the valve body 41 by a retainer 45 and a snap ring 49.

When the water gets warmer, the piston 4 of the wax motor 1 extends, pushing the valve plunger 46 against a valve seat 42, effectively closing the valve 40 and stopping the flow of water through the valve 40.

After the water has stopped flowing through the valve 40, a cam 47 may be rotated 90° to press on a flange 53 on the valve plunger 46 and lift the valve plunger 46 away from the valve seat 42 to restore the flow of water. Because the piston 4 of the wax motor 1 is extended and has high force, lifting the valve plunger 46 also lifts the wax motor 1 and the washer 46, compressing the relief spring 44. The relief spring 44 is designed so that it will not compress fully (bottom out) before the piston 4 of the wax motor 1 has reached its maximum over-extension when all of the wax therein has melted. Except for the cam 47 lifting the flange 64 of the valve plunger 46, the operation of the valve 40 is entirely the same as the operation of the valve 10 of FIGS. 4 through 9, so the detailed description of its operation and its various operating states is abbreviated.

Figure 12:
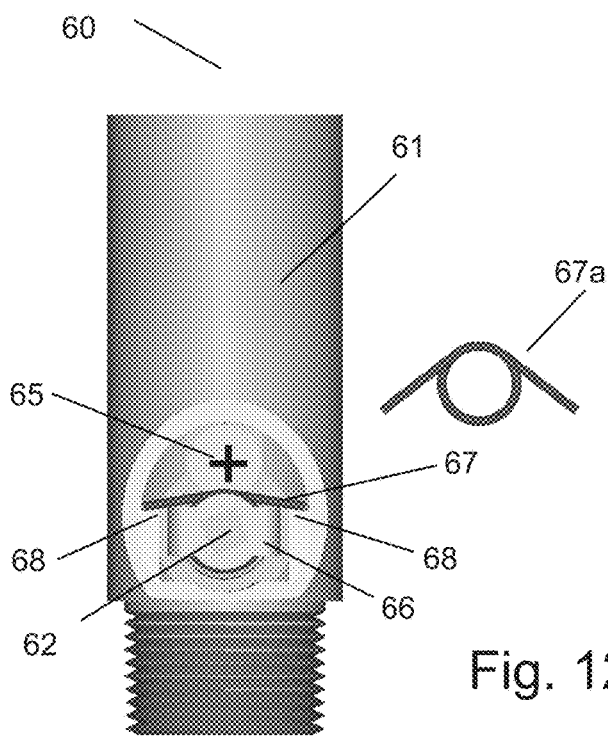
FIG. 12 shows a side view of a self-centering mechanism for the cam.
Figure 13:
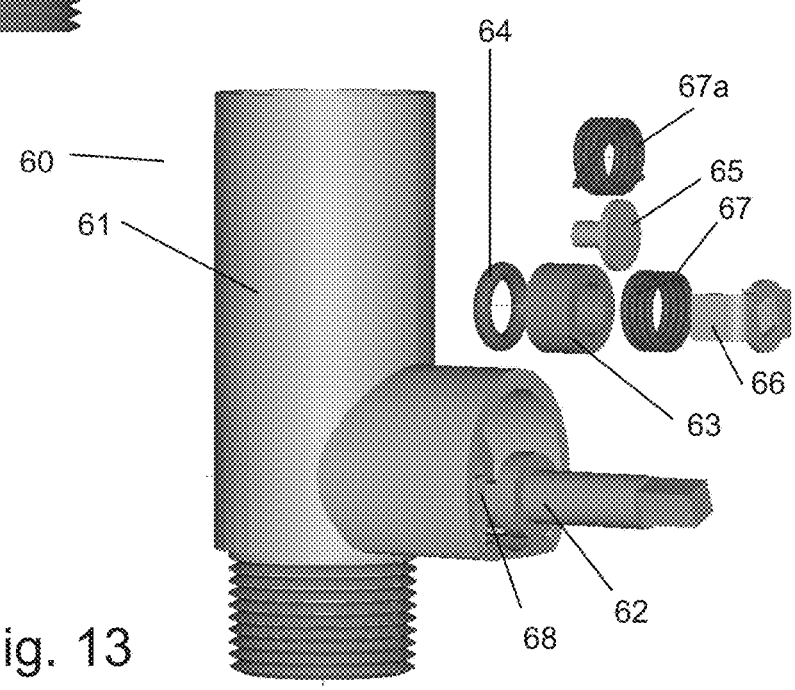
FIG. 13 shows the self-centering mechanism of FIG. 11 with its parts separated, to show the details of the parts more clearly.

FIGS. 12 and 13 show a valve 60 having a torque spring 67 which acts on a cam 62 and urges it to its quiescent position. When the cam 62 is in its quiescent position, it is disengaged from the valve plunger, which is not visible, but which is similar to the valve plunger 46 of FIG. 10. The torque spring 67 has an unloaded shape 67a. When the torque spring 67 is installed in a valve body 61, it is preloaded against stops 68,68 in the valve body 61. A double lever 66 is placed on the cam 62, and the double lever 66 is prevented from rotating with respect to the cam, as, for example, not a limitation, by having a square hole in the double lever 66 which fits on a complementary square extension of the shaft of the cam 62. If the cam 62 is turned either direction, clockwise or anticlockwise, the torque spring 67 will urge the cam 62 back to its quiescent position.

A bushing 63 retains the cam 62 in the valve body 61, and the bushing 63 is held in place by a screw 65. An "O" ring 64 provides a seal.

All embodiments of this invention have a cam, and all require a torque spring that urges the cam to its quiescent position. Such mechanisms are familiar and varied, and their specific designs are not a point of novelty of the invention, so one example only is given. A familiar example of such a self-centering torque spring which urges a cam to its quiescent position is a door knob. It can be turned in either direction to withdraw the door latch, and it returns to the center position when released.

FIGS. 14 through 21 show various views of an alternate embodiment of this invention.

FIGS. 14 and 15 show side views of a valve 80 in alternative positions representative of typical installations. When installed, the valve 80 may be screwed onto a shower arm (not shown) which engages female pipe threads 93 in a valve body 81. Pipe threads usually are tapered, so the fit becomes tighter and tighter as the female pipe threads 93 are screwed on until the fit is sufficiently tight to prevent leaks. However, it is preferred that the valve 80 be vertical, either in the position of FIG. 14 or in the position of FIG. 15. If the valve 80 is not vertical when the fit is tight, the valve 80 may be turned more until it is vertical. In either of these position, pulling on a lanyard 95 can turn a handle 95 to actuate the valve 80. The lanyard 96 may be used to actuate the valve 80 if the person operating the valve 80 cannot reach the handle conveniently.

The valve 80 comprises a valve body 81 with a wax motor 1 therein. The wax motor 1 has a piston 4 which engages a hood 82 and pushes against the hood 82 when the piston 4 is extended or over-extended. The hood 64 pushes against a relief spring 85 which is contained within a cap 83. A nut 84 screws onto the cap 83 and retains the relief spring 85 and the hood 82. The cap 83, the relief spring 85, the hood 82 and the nut 84 may be assembled as a subassembly, and by doing so, the preload force of the relief spring 85 is contained and the strong force of the relief spring 85 is not an issue in the final assembly of the valve 80. The cap 83 screws into the valve body 81 with a gasket 92 to make a seal so that water does not leak out.

A valve plunger 86 screws onto a bushing 3 of the wax motor 1. In this drawing, it is assumed that the inside diameter of the valve plunger 86 is threaded, but alternatively, the valve plunger 86 may have a smooth bore and it may be retained on the bushing 3 of the wax motor 1 with a nut (not shown).

In operation, the valve plunger 86 slides up and down within the valve body 81 when the wax motor 1 moves. FIGS. 16 and 17 show the valve 80 in its cold state, when the temperature is below the actuation temperature of the wax motor 1. The wax motor 1, the piston 4 of the wax motor 1, the hood 82 ant the relief spring 85 are in their nominal position. The piston 4 of the wax motor 1 is retracted, and a working spring 87 pushes the wax motor 1 and the valve plunger 86 upwards so that the valve 80 is open and water can flow through it, out of holes 91.

Figure 19:
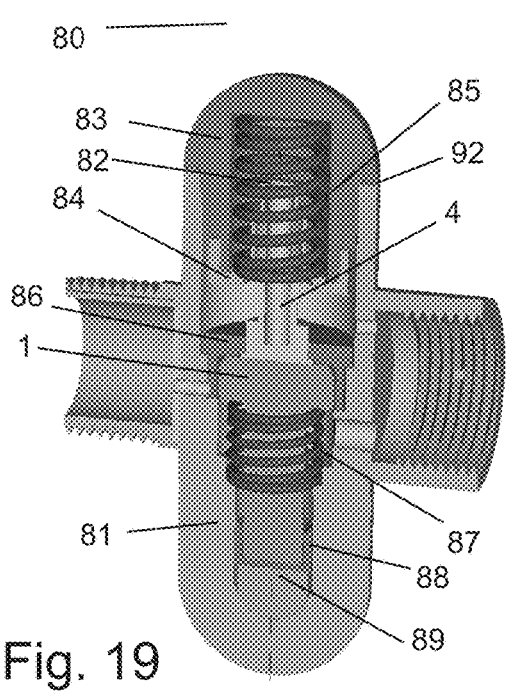

FIG. 19 shows the valve 80 in its warm but closed state. The temperature is above the actuation temperature of the wax motor 1, and the piston 4 is extended. Because the piston 4 pushes against the hood 86 and the relief spring 85, and because the force of the relief spring 85 is much higher than the force of the working spring 87, the entire wax motor 1 and the valve plunger 86 are displaced downward. The travel of the valve plunger 86 is stopped by flats 95 and 96 that together comprise a valve seat on the inside of the valve body 81. When the valve plunger 86 contacts the valve seat comprising the flats 95 and 96, water can no longer flow through the valve 80, out of the holes 91.

Figure 20:
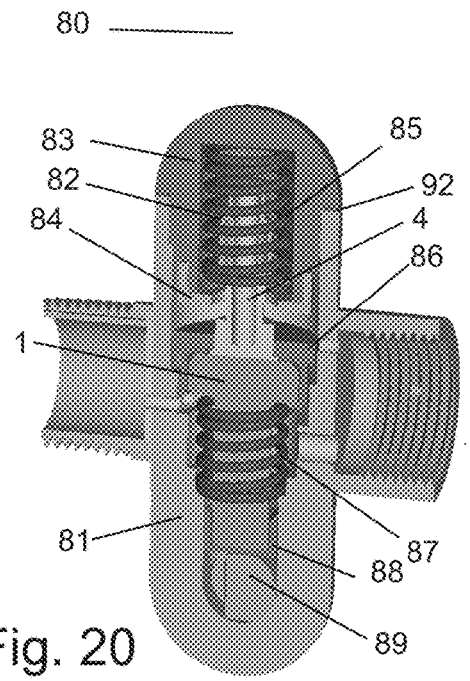

In FIG. 20, a cam 89 has been actuated by rotating it 90°. This pushes up on a cam follower 88, the wax motor 1 and the valve plunger 86, opening the valve 80. The hood 82 is pushed up, and the relief spring 85 is partially compressed. Because the relief spring 85 has a relatively large force, the force downward on the cam follower 88 is a detent on the cam 89, keeping it from returning to its quiescent position. Although not shown, it should be understood that there is a torque spring acting on the cam 89 functionally equivalent to that shown in FIGS. 12 and 13 urging the cam to its quiescent position. The cam 89 is mounted into the valve body 81 with a bushing 90 and an "O" ring 91.

Figure 21:
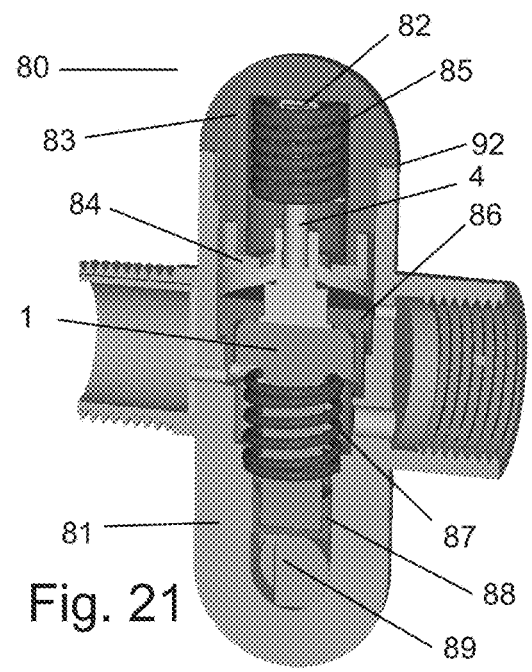

FIG. 21 shows the valve 80 when the piston 4 is over-extended. The hood 82 is pushed further upward, and the relief spring 85 is compressed further as well. It is important that the relief spring 85 does not bottom out before the over-extension of the piston 4 of the wax motor 1 has reached its maximum extension.

Figure 22:
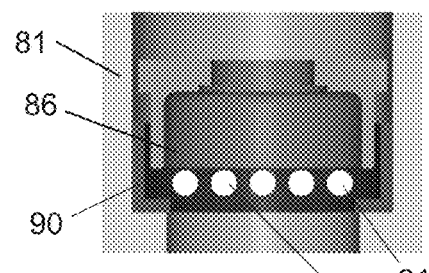
FIGS. 22 and 23 show in more detail the operation of the valve plunger and the valve seat of the valve of FIG. 17, however an alternative valve seat is also shown.
Figure 23:
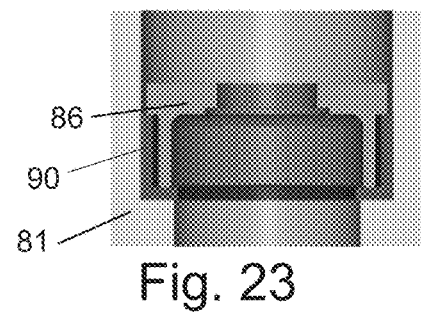

FIGS. 22 and 23 show an alternative valve seat 90 for the valve 80 of FIGS. 14 through 21. Instead of using a valve seat comprising the steps 95 and 96 in the inside diameter of the valve body 81, the valve seat 90 is inserted into the valve body 81. While functionally equivalent, it may be preferred to use a more corrosion-resistant material for the valve seat 90. The valve body 81 may be of brass, as an example, not a limitation, and the tin in brass leaches in some untreated water, deteriorating its surface and making it unsuitable as a valve seat material. Preferably, both the valve seat 90 and the valve plunger 86 are made of a corrosion resistant material that is anti-fouling.

The invention claimed is:

1. A valve for saving water and energy, comprising
a valve body having an inlet for receiving water and an outlet;
a wax motor mounted within the valve body such that that the wax motor can move in an axial direction;
a relief spring that holds the wax motor in its nominal position axially within the valve body;
the wax motor having at least
a capsule and a piston, wherein
the wax motor is responsive to an actuation temperature, whereby
the piston is retracted into the capsule when the temperature is less than the actuation temperature,
the piston is extended from the capsule to a working position when the temperature reaches the actuation temperature, and
the piston is over-extended from the capsule to a maximum extension when the temperature is maintained at or above the actuation temperature;
a valve plunger and
a valve seat, wherein
the valve is open to the flow of water when the valve plunger is separated from the valve seat, and
the valve is closed to the flow of water when the valve plunger is in contact with the valve seat,
the piston engages the valve plunger, moving the valve plunger so that the valve is open when the piston is retracted and so that the valve is closed when the piston is extended,
a cam,
a handle for turning the cam,
a torque spring acting on the cam, which urges the cam to a quiescent position,
when the cam is in its quiescent position, the cam is disengaged from the valve plunger,
when the cam is turned to an actuated position, the cam engages the valve plunger and moves the valve plunger away from the valve seat to open the valve irrespective of the position of the piston relative to the wax motor,
a cam detent,
the cam detent holds the cam in the actuated position if the cam is turned to the actuated position while the piston is extended or over-extended,
the cam detent releases the cam to return to its quiescent position when the piston is retracted,
the wax motor further having a minimum required piston force acting on the piston so that it will properly retract into the capsule when the temperature is less than the actuation temperature,
a working spring acting upon the piston that has a working spring force that is greater than the minimum required piston force,
the relief spring has a relief spring preload force that is greater than the working spring force,
the wax motor further having a maximum piston force above which the wax motor may be damaged permanently
the relief spring yields allowing the wax motor to move within the valve body when the force on the piston is greater than the relief spring preload force, and
the relief spring has a maximum relief spring force that is less than the maximum piston force.

2. A valve for saving water and energy, comprising
a valve body having an inlet for receiving water and an outlet;
a wax motor mounted within the valve body such that that the wax motor can move in an axial direction;
a relief spring that holds the wax motor in its nominal position axially within the valve body;
the wax motor having at least
a capsule and a piston, wherein
the wax motor is responsive to an actuation temperature, whereby
the piston is retracted into the capsule when the temperature is less than the actuation temperature,
the piston is extended from the capsule to a working position when the temperature reaches the actuation temperature, and
the piston is over-extended from the capsule to a maximum extension when the temperature is maintained at or above the actuation temperature;
a valve plunger and
a valve seat, wherein
the valve is open to the flow of water when the valve plunger is separated from the valve seat, and
the valve is closed to the flow of water when the valve plunger is in contact with the valve seat,
the valve plunger is fixed to the wax motor such that the valve plunger moves together axially with the wax motor,
the piston pushes against the relief spring when the piston is extended, causing the wax motor and the valve plunger to move together such that the valve is open when the piston is retracted and the valve is closed when the piston is extended,
a cam,
a handle for turning the cam,
a torque spring acting on the cam, which urges the cam to a quiescent position,
when the cam is in its quiescent position, the cam is disengaged from the wax motor,
when the cam is turned to an actuated position, the cam engages the wax motor and moves the wax motor and the valve plunger so as to move the valve plunger away from the valve seat to open the valve irrespective of the position of the piston relative to the wax motor,
a cam detent, the cam detent holds the cam in the actuated position if the cam is turned to the actuated position while the piston is extended or over-extended, the cam detent releases the cam to return to its quiescent position when the piston is retracted, the wax motor further having a minimum required piston force acting on the piston so that it will properly retract into the capsule when the temperature is less than the actuation temperature, a working spring acting upon the piston that has a working spring force that is greater than the minimum required piston force, the relief spring has a relief spring preload force that is greater than the working spring force, the wax motor further having a maximum piston force above which the wax motor may be damaged permanently the relief spring yields allowing the wax motor to move within the valve body when force on the piston is greater than the relief spring preload force, and the relief spring has a maximum relief spring force that is less than the maximum piston force.

\* \* \* \* \*